United States Patent [19]

Sublett et al.

[11] Patent Number: 4,983,711

[45] Date of Patent: Jan. 8, 1991

[54] COPOLYESTERS AND ARTICLES EXTRUSION BLOW-MOLDED THEREFROM

[75] Inventors: Bobby J. Sublett; Randy S. Beavers, both of Kingsport, Tenn.

[73] Assignee: Eastman Kodak Company, Rochester, N.Y.

[21] Appl. No.: 445,062

[22] Filed: Dec. 4, 1989

[51] Int. Cl.[5] .............................................. C08G 63/02
[52] U.S. Cl. ..................................... 528/272; 528/296; 528/302; 528/308; 528/308.6; 525/437; 525/444; 264/328.1; 264/331.11
[58] Field of Search ............... 528/272, 296, 302, 308, 528/308.6; 525/437, 444; 264/328.1, 331.11

[56] References Cited

U.S. PATENT DOCUMENTS

| | | | |
|---|---|---|---|
| 4,217,440 | 8/1980 | Barkey | 528/274 |
| 4,256,860 | 3/1981 | Davis et al. | 525/437 |
| 4,398,022 | 8/1983 | Sublett | 528/302 |

*Primary Examiner*—Morton Foelak
*Assistant Examiner*—Sam A. Acquah
*Attorney, Agent, or Firm*—J. Frederick Thomsen; William P. Heath, Jr.

[57] ABSTRACT

Disclosed are copolyesters containing residues of terephthalic acid, ethylene, glycol, 1,4-cyclohexanedimethanol and a trifunctional monomer which are useful in manufacturing rigid containers by extrusion blow-molding processes.

9 Claims, No Drawings

COPOLYESTERS AND ARTICLES EXTRUSION BLOW-MOLDED THEREFROM

This invention pertains to novel copolyesters which possess sufficient melt strength to be used in extrusion blow-molding processes to make relatively large, rigid containers and other shaped articles. More particularly, this invention pertains to copolyesters containing residues of terephthalic acid, ethylene glycol, 1,4-cyclohexanedimethanol and at least one trifunctional monomer and to shaped articles produced therefrom which exhibit good impact properties.

Various types of containers currently made from glass are being replaced by plastic containers due to the weight, bulkiness and susceptibility to breakage inherent in glass containers. Manufacturing equipment and processes have been designed and put in use for the cost-efficient production of various types and sizes of containers at high rates. One of these manufacturing processes is extrusion blow-molding wherein a polymer melt is extruded from a die downward in the shape of a hollow cylinder or tube. Bottles and other shaped articles are produced by clamping a mold around the molten, hollow cylinder and injecting a gas, e.g., air, into the molded-encased cylinder to force the molten polymer into the mold. This process is advantageous in avoiding the necessity of the parison-forming operation required in the stretch blow-molding technique of manufacturing containers and can be used to manufacture large containers such as 5-gallon (18.92 L) carboys.

For a polymer to be useful in extrusion blow-molding processes, it is essential that the polymer possess sufficient melt strength. To be useful for the production of rigid (self-supporting) containers, especially relatively large containers, e.g., containers intended for packaging volumes of 5 L or greater, and containers having an irregular shape, the polymer also must possess adequate physical, tensile and thermal properties. Many polymeric materials do not possess melt strength sufficient to render them suitable for extrusion blow-molding and, when extruded downward from a die, the polymer melt drops rapidly and forms a thin string and/or breaks. Polymers suitable for extrusion blow-molding have a melt strength which is sufficient to support the weight of the polymer. Good melt strength also is essential for the manufacture by extrusion blow-molding of containers having uniform wall thickness.

Melt strength of the copolyesters of this invention is determined according to ASTM D3835 by extruding the molten polymer downward through a die 0.1 inch in diameter and 0.25 inches long at a shear rate of 20 second$^{-1}$ using as Instron rheometer and allowing the extrudate to fall freely. The diameter of the end of a six inch length of extrudate (measured from the exit face of the die) is measured. The percent melt strength is determined from the formula:

$$\frac{D - 0.1}{0.1} \times 100$$

wherein D is the diameter, in inches, of the extrudate supporting a six inch length of extrudate. If D is less than 0.1 inch, the melt strength is a negative number since there is no increase in the diameter of the extrudate. If D is greater than 0.1 inch, the melt strength is a positive number. For polyesters and copolyesters there is a correlation between percent melt strength and suitability for extrusion blow-molding. The copolyesters provided by this invention have a melt strength percent of 10 or greater, preferably at least 25, at their processing temperatures and may be used to extrusion blow-mold articles of various sizes.

The copolyesters provided by our invention have an inherent viscosity of about 0.5 to 1.0 and a melt strength percent of at least about 10 and are comprised of:

A. diacid residues comprising terephthalic acid residues;

B. diol residues comprising about 25 to 75 mole percent ethylene glycol residues and about 25 to 75 moles percent 1,4-cyclohexanedimethanol residues; and C. about 0.05 to 1.0 mole percent of the residue of a trifunctional monomer.

These copolyesters have been found to be useful for extrusion blow-molding to produce transparent, non-crystalline articles such as containers which exhibit good impact strength. We have found that the presence of the trifunctional residue (branching agent) provides the copolyesters with improved melt strength but without imparting brittleness and poor impact properties to articles molded from the copolyesters. The presence of the trifunctional residues in the copolyesters imparts sufficient melt strength for extrusion blow-molding and also improves the impact properties over a wide range of inherent viscosities and concentrations of the trifunctional residues.

Normally, diacid residues A consist of at least 40 mole percent, preferably at least 100 mole percent, terephthalic acid residues. The remainder of the diacid component A may be made up of one more alicyclic and/or aromatic dicarboxylic acid residues commonly present in polyesters. Examples of such dicarboxylic acids include 1,2-, 1,3- and 1,4-cyclohexanedicarboxylic, 2,6- and 2,7-naphthalenedicarboxylic, isophthalic and the like. Diacid residues A may be derived from the dicarboxylic acids or from ester forming derivatives thereof such as dialkyl esters or acids chlorides.

The trifunctional residues C can be derived from tricarboxylic acids or ester forming derivatives thereof such as trimellitic (1,2,4-benzenetricarboxylic) acid and anhydride, hemimellitic (1,2,3-benzenetricarboxylic) acid and anhydride, trimesic (1,3,5-benzenetricarboxylic) acid and tricarballyic (1,2,3-propanetricarboxylic) acid. Generally, any tricarboxyl residue containing about 6 to 9 carbon atoms may be used as component C. The trifunctional residue also may be derived from an aliphatic triol containing about 3 to 8 carbon atoms such as glycerin, trimethylolethane and trimethylolpropane. The amount of the trifunctional monomer residue present in the copolyester preferably is in the range of about 0.10 to 0.25 mole percent. The preferred trifunctional monomer residues are residues of benzenetricarboxylic acids (including anhydrides), especially trimellitic acid or anhydride.

The mole percentages referred to herein are based on 100 mole percent component A and 100 mole percent component B. The mole percent of component C is based on (1) the moles of Component A when Component C is a triacid residues and (2) the moles of component B when Component C is a triol.

An especially preferred group of our novel copolyesters have an inherent viscosity of about 0.7 to 0.9 and and a melt strength percent of at least about 25 and are comprised of:

A. diacid residues consisting essentially of terephthalic acid residues;

B. diol residues consisting essentially of about 25 to 65 mole percent 1,4-cyclohexanedimethanol residues and about 35 to 75 mole percent ethylene glycol residues; and C. about 0.1 to 0.25 mole percent trimellitic acid residues.

The copolyesters of our invention may be prepared using procedure well-known in the art for the preparation of high molecular weight polyesters. For example, the copolyesters may be prepared by direct condensation using a dicarboxylic acid or by ester interchange using a dialkyl dicarboxylate. Thus, a dialkyl terephthalate such as dimethyl terephthalate is ester interchanged with the diols at elevated temperatures in the presence of a catalyst. Polycondensation is carried out at increasing temperatures and at reduced pressures until a copolyester having the desired inherent viscosity is obtained. The inherent viscosities (I.V., dl/g) reported herein were measured at 25° C. using 0.5 g polymer per 100 mL of a solvent consisting of 60 parts by weight phenol and 40 parts by weight tetrachloroethane. The mole percentages of the diol residues of the polyesters were determined by gas chromatography.

Our novel copolyesters are further illustrated by the following examples.

EXAMPLE 1

The following materials were placed in a 500-mL three-neck, round-bottom flask:

96.85 g (0.49925 mol) dimethyl terephthalate
22.32 g (0.155 mol) 1,4-cyclohexanedimethanol
42.78 g (0.690 mol) ethylene glycol
0.1575 g (0.00075 mol) trimellitic acid
0.00624 g Ti from a butanol solution of titanium tetraisopropoxide
0.00648 g Mn from an ethylene glycol solution of manganese acetate tetrahydrate
0.00803 g Co from an ethylene glycol solution of cobaltous acetate The flask was equipped with a nitrogen inlet, stirrer, vacuum outlet and condensing flask. The flask was immersed in a Belmont metal bath and heated with stirring for 1 hour at 200° C. and then for 1 hour at 210° C. At this time the theoretical amount of methanol had been collected and 1.34 mL of a mixed phosphorous ester composition (Zonyl A) containing 0.0137 g phosphorus was added to the flask. The bath temperature was heated to 280° C., the nitrogen inlet was clamped off and vacuum was applied to reduce the pressure in the flask to 0.1 to 0.5 mm Hg. The temperature was maintained at 280° C. with stirring at the reduced pressure for 75 minutes. The metal bath was then removed, the vacuum outlet clamped off, the nitrogen inlet opened and the flask allowed to come to atmospheric pressure under a nitrogen blanket. The copolyester was allowed to cool to room temperature. The composition of the copolyester thus obtained was:

| Diacid component: | 100 mole percent terephthalic acid residues; |
|---|---|
| Diol component: | 31.0 mole percent 1,4-cyclohexanedimethanol residues and 69.0 mole percent ethylene glycol residues; and |
| Trifunctional monomer residues: | 0.15 mole percent trimellitic acid residues. |

The copolyester had an inherent viscosity of 0.81 and a percent melt strength, determined as described hereinabove using an extrusion temperature of 230° C., of 28.5%.

The copolyesters of Examples 2-14 and Comparative Examples 1-4 were prepared according to the procedure described in Example 1, using varying periods of polycondensation to obtain polymers of different inherent viscosities. The diacid component of the copolyesters of all of the examples consisted of terephthalic acid residues. For the copolyesters of Examples 2-7 and Comparative Examples 1 and 2, the diol component consisted of 31 mole percent 1,4-cyclohexanedimethanol and 69 mole percent ethylene glycol residues and the trifunctional component was varied from 0 to 0.20 mole percent trimellitic acid residues. For the copolyesters of Examples 8-15 and Comparative Examples 3 and 4, the diol component consisted of 60 mole percent 1,4-cyclohexane-dimethanol and 40 mole percent ethylene glycol residues and the trifunctional component was varied from 0 to 0.30 mole percent trimellitic acid residues.

The mole percent trimellitic acid residues (TMA) contained in and the melt strength (%) and inherent viscosity (I.V., dl/g) of the copolyesters of Examples 2-13 and Comparative Examples C-1–C-4 are set forth in Table I. The extrusion temperature used in the melt strength tests was 230° C. for Examples 2-6 and Comparative Examples C-1 and C-2 and 240° C. for Examples 7-14 and Comparative Examples C-3 and C-4.

TABLE I

| Example | TMA | Melt Strength | I.V. |
|---|---|---|---|
| 2 | 0.10 | 12.0 | 0.73 |
| 3 | 0.10 | 29.6 | 0.79 |
| 4 | 0.15 | 16.0 | 0.74 |
| 5 | 0.15 | 27.7 | 0.79 |
| 6 | 0.20 | 25.1 | 0.75 |
| 7 | 0.15 | 26.0 | 0.75 |
| C-1 | 0 | −10.0 | 0.74 |
| C-2 | 0 | 8.4 | 0.84 |
| 7 | 0.15 | 20.1 | 0.82 |
| 8 | 0.15 | 34.0 | 0.88 |
| 9 | 0.20 | 24.5 | 0.80 |
| 10 | 0.20 | 37.0 | 0.87 |
| 11 | 0.25 | 25.8 | 0.79 |
| 12 | 0.25 | 41.5 | 0.88 |
| 13 | 0.30 | 36.3 | 0.82 |
| 14 | 0.30 | 54.3 | 0.91 |
| 15 | 0.25 | 17.0 | 0.75 |
| C-3 | 0 | −40.9 | 0.73 |
| C-4 | 0 | −24.5 | 0.81 |

The Table I data show that the copolyesters of Comparative Examples C-1–C-4 have melt strengths of less than 10 even though their inherent viscosities range from 0.73 to 0.84 and thus increasing the molecular weight significantly did not improve the melt strengths of those copolyesters. In contrast, the copolyesters of our invention all possess melt strengths greater than 10 and thus are suitable for extrusion blow-molding, especially extrusion blow-molding large containers.

Cylindrical bottles 15 cm in length and 5.5 cm in diameter having a wall thickness of approximately 35 mils (0.9 mm) and an internal volume of approximately 10 ounce (296 ml) were extrusion blow-molded from the copolyesters of Examples 7 and 15 and Comparative Examples C-1 and C-3 using a Bekum 121S extrusion blow molding apparatus equipped with a polypropylene screw, a die having an inside diameter of 0.702 inch (17.8 mm) and a mandrel having an outside diamter of 0.56 inch (14.2 mm). The extruder was operated at a screw speed of 9 revolutions per minute using the following barrel temperature profile: zone 1–440° F. (226.7° C.), zone 2–475° F. (246.1° C.), zone 3–430° F. (221.1° C.), zone 4–400° F. (204.4° C.). The upper and lower die body temperature was 400° F. and that of the die tip was 405° F. The bottles were extrusion blow molded at cycle and blow times of 14 and 7.5 seconds, respectively.

The impact strength of the bottles was determined by filling the bottles with water and then dropping them repeatedly from progressively greater heights. The last height at which the filled bottle was dropped without fracturing was recorded as the impact strength in feet. The impact strengths thus determined were:

| Bottles Fabricated From Copolyester of Example | Impact Strength |
|---|---|
| 7 | 10.2 |
| C-1 | 5.1 |
| 15 | 8.5 |
| C-3 | 6.9 |

The above-described tests demonstrate that the copolyesters provided by our invention possess impact strengths which are substantially greater than the impact strengths of copolyesters which do not contain any trifunctional monomer residue. Furthermore, the use of copolyesters which do not contain any trifunctional monomer residue in the extrusion blow molding of larger containers, e.g., containers having a capacity of 1 gallon (3.79 L) or greater, presents problems with respect to uniformity of wall thickness. These problems include inadequate wall thickness at or near the top of such containers.

The invention has been described in detail with particular reference to preferred embodiments thereof, but it will be understood that variations and modifications will be effected within the spirit and scope of the invention.

We claim:

1. A copolyester having an inherent viscosity of about 0.5 to 1.0 and an ASTM D3835 melt strength percent of at least about 10 comprised of:
   A. diacid residues comprising terephthalic acid residues;
   B. diol residues comprising about 25 to 75 mole percent ethylene glycol residues and about 25 to 75 mole percent 1,4-cyclohexanedimethanol residues; and
   C. about 0.05 to 1.0 mole percent of the residue of a trifunctional monomer.

2. A copolyester according to claim 1 comprised of:
   A. diacid residues comprising at least 40 mole percent terephthalic acid residues;
   B. diol residues comprising about 35 to 75 mole percent ethylene glycol residues, about 25 to 65 mole percent 1,4-cyclohexanedimethanol residues; and
   C. about 0.05 to 1.0 mole percent of the residue of a benzenetricarboxylic acid.

3. A copolyester according to claim 1 having an inherent viscosity of about 0.7 to 0.9 comprised of:
   A. diacid residues comprising at least 40 mole percent terephthalic acid residues;
   B. diol residues comprising about 25 to 75 mole percent ethylene glycol residues, about 25 to 75 moles percent 1,4-cyclohexanedimethanol residues; and
   C. about 0.1 to 0.25 mole percent of the residue of a benzenetricarboxylic acid.

4. A copolyester according to claim 1 having an inherent viscosity of about 0.7 to 0.9 and an ASTM D3835 melt strength percent of at least about 25 comprised of:
   A. diacid residues comprising at least 40 mole percent terephthalic acid residues;
   B. diol residues comprising about 25 to 75 mole percent ethylene glycol residues, about 25 to 75 moles percent 1,4-cyclohexanedimethanol residues; and
   C. about 0.1 to 0.25 mole percent of the residue of a benzenetricarboxylic acid.

5. A copolyester having an inherent viscosity of about 0.7 to 0.9 and an ASTM D3835 melt strength percent of at least about 25 comprised of:
   A. diacid residues consisting essentially of terephthalic acid residues;
   B. diol residues consisting essentially of about 25 to 75 mole percent 1,4-cyclohexanedimethanol residues and about 25 to 75 mole percent ethylene glycol residues; and
   C. about 0.1 to 0.25 mole percent trimellitic acid residues.

6. A shaped article extrusion blow-molded from the polyester of claim 1.

7. A container extrusion blow-molded from the polyester of claim 5.

8. A rigid container having an internal volume of about 5 L or greater extrusion blow-molded from a copolyester having an inherent viscosity of about 0.5 to 1.0 and an ASTM D3835 melt strength percent of at least about 10 comprised of:
   A. diacid residues comprising terephthalic acid residues;
   B. diol residues comprising about 25 to 75 mole percent ethylene glycol residues and about 25 to 75 mole percent 1,4-cyclohexanedimethanol residues; and
   C. about 0.05 to 1.0 mole percent of the residue of a trifunctional monomer.

9. A container according to claim 8 extrusion blow-molded from a copolyester having an inherent viscosity of about 0.7 to 0.9 and an ASTM D3835 melt strength percent of at least about 25 comprised of:
   A. diacid residues consisting essentially of terephthalic acid residues;
   B. diol residues consisting essentially of about 25 to 75 mole percent 1,4-cyclohexanedimethanol residues and about 25 to 75 mole percent ethylene glycol residues; and
   C. about 0.1 to 0.25 mole percent trimellitic acid residues.

* * * * *